US006667353B2

(12) United States Patent
Agostini et al.

(10) Patent No.: US 6,667,353 B2
(45) Date of Patent: *Dec. 23, 2003

(54) RUBBER COMPOSITION AND TIRE HAVING TREAD THEREOF

(75) Inventors: Giorgio Agostini, Colmar-Berg (LU); Thierry Florent Edme Materne, Attert (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 246 days.

This patent is subject to a terminal disclaimer.

(21) Appl. No.: 09/735,220

(22) Filed: Dec. 12, 2000

(65) Prior Publication Data

US 2001/0004648 A1 Jun. 21, 2001

Related U.S. Application Data

(63) Continuation of application No. 09/028,041, filed on Feb. 23, 1998, now Pat. No. 6,172,137.
(60) Provisional application No. 60/055,603, filed on Aug. 12, 1997.

(51) Int. Cl.$^7$ .............................. C08K 9/06; B60C 11/00
(52) U.S. Cl. ........................ 523/212; 523/215; 524/492; 524/495; 524/571; 524/575; 525/105; 525/331.9; 525/332.9; 152/209.1; 152/905
(58) Field of Search ................................ 523/212, 215; 524/492, 495, 571, 572, 575; 525/105; 152/209 RR, 950

(56) References Cited

U.S. PATENT DOCUMENTS

| 4,820,751 A | 4/1989 | Takeshita et al. ............ 523/215 |
| 5,679,728 A | 10/1997 | Kawazura et al. ........... 523/215 |
| 5,830,930 A | 11/1998 | Mahmud et al. ............. 523/215 |
| 5,883,179 A | 3/1999 | Kawazoe et al. ............ 524/492 |
| 6,020,068 A | 2/2000 | Kawazura et al. .......... 428/405 |
| 6,172,137 B1 * | 1/2001 | Agostini et al. ............. 523/212 |

FOREIGN PATENT DOCUMENTS

| EP | 0711805 | 5/1996 | ............. C08K/9/02 |
| WO | 9637546 | 11/1996 | ............. C08K/21/00 |
| WO | 9637547 | 11/1996 | ............. C08L/21/00 |

OTHER PUBLICATIONS

European Search Report.
"Chemistry of Pigments and Fillers", A Wiley–Interscience Publication, New York, by D. H. Solomon et al. 85–88.

* cited by examiner

*Primary Examiner*—Fred Teskin
(74) *Attorney, Agent, or Firm*—Henry C. Young, Jr.

(57) ABSTRACT

A rubber composition comprised of an elastomer(s) reinforced with a particulate carbon black composite, and a coupling agent. Said carbon black composite contains integral silica on the surface thereof, wherein said carbon black composite is prepared by co-precipitating carbon black and silica from a dispersion of carbon black in sodium silicate to provide integral silica domains on the outer surface of the carbon black. Said carbon black composite is further functionalized by reacting it with a trialkoxy silane. A tire having a component comprised of such rubber composition, such as, for example, a tire tread is contemplated.

10 Claims, No Drawings

RUBBER COMPOSITION AND TIRE HAVING TREAD THEREOF

FIELD

This is a Continuation of Continued Prosecution application Ser. No. 09/028,04 1, filed on Feb. 23, 1998, now U.S. Pat. No. 6,172,137 B1, which claims priority to U.S. Provisional Application Serial No. 60/055,603, filed Aug. 12, 1997.

BACKGROUND

Tires are typically prepared of treads of elastomer based rubber compositions which are conventionally carbon black reinforced. Sometimes tire tread rubber compositions may also be reinforced with silica by utilizing a combination of individual silica and carbon black particles. Typically the silica is a precipitated silica.

Often coupling agents are used with precipitated silica to assist in its reinforcement of elastomers with which the silica is mixed. Utilization of silica couplers for such purpose is well known to those skilled in such art.

It is appreciated that electrical conductivity of a rubber composition is reduced when silica replaces a portion of more conventional carbon black for reinforcing rubber compositions.

In the description of this invention, the term "phr" where used herein, and according to conventional practice, refers to "parts of a respective material per 100 parts by weight of rubber, or elastomer".

In the description of this invention, the terms "rubber" and "elastomer" if used herein, may be used interchangeably, unless otherwise prescribed. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art.

SUMMARY AND PRACTICE OF THE INVENTION

In accordance with this invention, a rubber composition is provided which is comprised of (A) 100 parts by weight of at least one diene-based elastomer selected from homopolymers of conjugated dienes, copolymers of conjugated dienes and copolymers of conjugated dienes with vinyl aromatic compounds such as styrene and alpha-methylstyrene;

(B) about 30 to about 110, alternatively about 30 to about 90, phr of reinforcing filler composed of (i) a carbon black composite containing integral silica on the surface thereof or (ii) about 20 to about 70, or even up to about 90, phr of said carbon black composite and at least one of (a) about 10 to about 80 phr of classical rubber reinforcing carbon black and (b) about 10 to about 80 phr of precipitated silica; wherein said carbon black composite is composed of carbon black having integral silica domains on the surface thereof; wherein said silica domains of said carbon black composite and said precipitated silica contain silanol groups on the surface thereof; wherein said carbon black of said carbon black composite and said classical carbon black contain hydroxyl groups on the surface thereof; and wherein the silicon to carbon ratio of said carbon black composite is in a range of about 0.1/1 to about 0.9/1.

(C) at least one coupling agent having a moiety reactive with the said silanol groups and said hydroxyl groups and another moiety interactive with at least one of said diene-based elastomers.

In one aspect of the invention, it is desired that the rubber composition is prepared by (a) thermomechanically working and mixing, in at least two sequential mixing steps, a mixture comprised of the said diene-based elastomer, carbon black composite, and optionally the said classical carbon black and/or precipitated silica, all in the absence of curatives cure accelerators (i) to a maximum temperature in a range of about 160° C. to about 180° C. and for a duration of time, upon reaching said maximum temperature, in a range of about 1 to about 10 minutes at a temperature within about 5° C. to about 10° C. of said maximum temperature or (ii) to a maximum temperature in a range of about 155° C. to about 165° C. and for a duration of time upon reaching said maximum temperature, in a range of about four to about twenty minutes at a temperature within about 5° C. to about 10° C. of said maximum temperature, followed by (b) a final thermomechanical mixing step in which sulfur curatives and cure accelerators are mixed with said mixture for about one to about four minutes to a temperature of about 90° C. to about 120° C.; whereas the rubber mixture is cooled to a temperature below about 40° C. between each of the aforesaid mixing stages.

Depending somewhat upon the rotor speed of the mixer, the fill factor and the rubber composition itself, the time to reach the maximum temperature may range from about 2 to about 5 minutes. The term "fill factor" is believed to be well known to those having skill in such art as the portion of the volume of the internal mixer occupied by the rubber composition itself. Other parameters being equal, a rubber composition having a higher oil content will usually take a longer time to reach the maximum temperature.

In practice, an internal rubber mixer is preferred for the individual mixing steps.

In a further aspect of the invention, a tire is provided having a component of the rubber composition of this invention. Such tire components may include, for example, tread, wire coat, sidewall and chafer, although other tire components might also be composed of the rubber composition.

Preferably, a tire is provided having a tread composed of the rubber composition of this invention.

An interesting feature of this invention is an ability to adjust the electrical conductivity of a rubber composition by selecting the ratio of carbon black to silica in the carbon black composite used in this invention. This feature may become significant where traction enhanced by use of silica reinforcement is desired but, conversely, it is desired to minimize the electrical conductivity reduction effect of the silica. Here, a method of modifying the volume resistivity of the rubber composition and, thus, the tire component such as a tire tread of this invention comprises providing the rubber composition having an electrical volume resistivity from about 1000 ohm.cm to about at least 10 meg.ohm.cm and possibly even to 10 to the twelfth power or more ohm.cm by (i) selectively modifying the carbon black composite by selectively preparing it (modifying it) to have a silicon to carbon ratio in the aforesaid range of about 0.1/1 to about 0.9/1 and (ii) adjusting the content of said carbon black composite in the rubber composition within the aforesaid ranges. Usually an electrical resistivity in a range of about 1000 to about 10 meg ohm.cm is desired, although in some cases a higher electrical resistivity may have to be used if greater friction (eg tire tread traction) is desired for the rubber composition.

The carbon black composite for use in this invention may be prepared by (i) cofuming carbon black with silica at an elevated temperature in a manner to provide a composite of carbon black with integral discrete silica entities, or domains, primarily on the outer surface of the carbon or by (ii) co-precipitating carbon black and silica such as, for example, from a dispersion of carbon black in sodium silicate, to provide integral silica entities, or domains, on the outer surface of the carbon black.

It is contemplated that the silica entities, or domains, on the surface of the carbon black of the carbon black composite are integral with the carbon black in a sense of being an actual part of the carbon black composite as compared to simple mixtures of carbon black and silica.

In the practice of this invention, it is to be appreciated that the carbon black conventionally has substituents on its surface such as, for example, hydroxyl groups as well as carboxyl, phenyl and quinone groups, which are generally considered to be reactive groups although for convenience, the hydroxyl groups are usually referred to in the description of this invention. It is also to be appreciated that the silica conventionally has silanol groups on its surface. Both of such hydroxyl groups and such silanol groups are intended to be conventionally reactive with the aforesaid coupler.

Therefore, it is considered herein that the carbon black composite utilized in this invention created by combining the carbon black and silica to create an integral structure, maximizes the availability of reactive sites for reaction with the coupler as compared to combining carbon black and silica by chemically reacting a silane such as, for example, reacting an alkoxy silane with the carbon black particularly since it is considered herein that such reaction would destroy a significant portion of the hydroxyl groups on the surface of the carbon black.

Accordingly, it is intended that the carbon black composite used in this invention is exclusive of, or at least essentially exclusive of a functionalized carbon black, other than the aforesaid inherently present hydroxyl and silanol groups, created by reacting carbon black with an organic silane, particularly an alkoxy silane, including trialkoxy silanes.

However, if desired, the surface of the carbon black composite can be further functionalized by reacting it with, for example, an organic silane such as, for example, a trialkoxy silane of the formula $(OR)_3SiR'$ where R is a hydrocarbon radical having from one to 3 or 4 carbon atoms such as, for example, those selected from methyl, ethyl and propyl radicals and R' is a hydrocarbon radical having from 6 to 16 or more carbon atoms such as, for example, those selected from hexyl, octyl, docecyl, hexadecyl and octadecyl radicals.

In practice, it is contemplated that the silica, which contains silanol groups on its surface, also includes silica containing from about 0.1 to about 10 percent of at least one of aluminum, titanium, zirconium and magnesium entities, based on the silicon. Usually aluminum and/or titanium is preferred. The aluminum, titanium, zirconium and magnesium moieties may be conventionally combined with the silica during its precipitation preparation synthesis process by methods well known to those skilled in such art. For example sodium aluminate may be added to the sodium silicate and then coprecipitated to form an aluminosilicate. Similarly, sodium titanate and sodium zirconate may be used to form similar silicates.

Classical rubber-reinforcing carbon blacks considered for use in this invention, including carbon blacks used for preparation of the carbon black composite, are, for example, carbon blacks having an Iodine Adsorption Number (ASTM test D1510) in a range of about 30 to about 180 and sometimes even up to about 250, or Nitrogen Adsorption Number (ASTM D3037), which might sometimes be referred to as a Nitrogen Specific Surface Area ($N_2SA$), in a range of about 30 to about 180 and even up to about 250, and a DBP (dibutylphthalate) Absorption Number (ASTM test D2414) in a range of about 20 to about 150. Representative examples of such carbon blacks, and references to associated ASTM test methods, may be found, for example, in *The Vanderbilt Rubber Handbook,* 1990 edition on pages 416 to 418.

For the purposes of this description, the Nitrogen Surface Area value ($N_2SA$) might also be referred to as a BET surface area as measured using nitrogen gas. A BET method of measuring surface area is described, for example, by Brunauer, Emmett and Teller: *Journal of American Chemical Society,* 60, (1938), page 309, although a more modern automated instrument is typically used. An additional reference might be DIN method 66131.

The resultant physical properties obtained for rubber compositions of this will depend somewhat upon the carbon black composite used, the coupler used and the rubber composition itself.

In practice, a contemplated weight ratio of coupler to the said carbon black composite, and additional precipitated silica if used, may be in a range of about 0.01/1 to about 0.25/1 which is somewhat dependent somewhat upon the silica concentration on the surface of the carbon black and, therefore, a corresponding silanol concentration in the carbon black composite.

The rubber composition itself can also be provided as being a sulfur cured composition through vulcanization of the uncured elastomer composition. The sulfur curing is accomplished in a conventional manner, namely, by curing under conditions of elevated temperature and pressure for a suitable period of time.

The curatives for sulfur curing the rubber composition are curatives conventionally used for sulfur curable elastomers which typically include sulfur and one or more appropriate cure accelerators and sometimes also a retarder. Such curatives and use thereof for sulfur curable elastomer compositions are well known to those skilled in the art.

Sequential mixing processes for preparing sulfur curable rubber compositions in which elastomers and associated ingredients exclusive of curatives are first mixed in one or more sequential steps, usually called a "non-productive mixing step(s)" followed by a final mixing step for adding curatives, usually called a "productive mixing step", are also well known to those skilled in the art.

In the practice of this invention, the elastomers are typically selected from homopolymers and copolymers of conjugated dienes and copolymers of conjugated diene(s) and vinyl aromatic compound. Such dienes may, for example, be selected from isoprene and 1,3-butadiene and such vinyl aromatic compounds may be selected from styrene and alpha-methylstyrene. Such elastomer, or rubber, may be selected, for example, from at least one of cis 1,4-polyisoprene rubber (natural and/or synthetic, and preferably natural rubber), 3,4-polyisoprene rubber, styrene/butadiene copolymer rubbers, isoprene/butadiene copolymer rubbers, styrene/isoprene copolymer rubbers, styrene/isoprene/butadiene terpolymer rubbers, cis 1,4-polybutadiene rubber, trans 1,4-polybutadiene rubber (70–95 percent trans), low vinyl polybutadiene rubber (10–30 percent vinyl), high vinyl polybutadiene rubber having from about 35 to about 90 percent vinyl 1,2-content and emulsion polymerization prepared butadiene/acrylonitrile copolymers.

In one aspect, particularly for a tire tread, the rubber might be of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and/or solution polymerization derived styrene/butadiene rubbers, and cis 1,4-polybutadiene rubber.

The vulcanized rubber composition should normally contain a sufficient amount of the said carbon black reinforcing filler(s), particularly the carbon black composite, namely, at least about 30, and usually at least about 40, phr to contribute toward a reasonably high modulus, high abrasion resistance and resistance to tear for the cured rubber composition. Thus the amount of said carbon black composite, as hereinbefore referenced, may be as low as about 30 parts per 100 parts rubber, but is usually preferably from about 40 to about 90 or even up to about 100 or more parts by weight.

Silica, particularly precipitated silica, as hereinbefore referenced, might also be used in combination with the said carbon black composite and coupler.

The commonly employed siliceous pigments used in rubber compounding applications can be used as the silica in this invention, including pyrogenic and precipitated siliceous pigments, including aluminosilicates, although, as indicated, precipitated silicas are preferred. It is intended for the practice of this invention that the term "precipitated silica", when used herein, also includes precipitated aluminosilicates as a form of precipitated silica.

The siliceous pigments preferably employed in this invention are precipitated silicas such as, for example, those obtained by the acidification of a soluble silicate, e.g., sodium silicate, generally exclusive of silica gels.

Such silicas might be characterized, for example, by having a BET surface area, as measured using nitrogen gas, preferably in the range of about 40 to about 600, and more usually in a range of about 50 to about 300 square meters per gram ($m^2/g$). The BET method of measuring surface area is described by Brunauer, Emmett and Teller: *Journal of American Chemical Society* (1938) page 309. An additional reference might be DIN method 66131.

The silica may also be typically characterized by having a DBP (dibutylphthalate) Absorption Number in a range of about 100 to about 400, and more usually about 150 to about 300 cc/100 g.

The silica might be expected to have an average ultimate particle size, for example, in the range of 0.003 to 0.05 micron as determined by the electron microscope, although the silica particles may be even smaller, or possibly larger, in size.

The silica may sometimes be expected to have mercury porosimetry characteristics such as, for example, HgSSA in a range of about 50 to about 250 $m^2/g$, a V(Hg) in a range of about 1 to about 3.5 $cm^3/g$ and a PSD max between 10 to about 50 nm.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Zeosil 1165MP and silicas available from Degussa AG with, for example, designations VN2 and VN3, BV3380GR, etc. and from Huber as Zeopol 8745.

Various couplers may be used and many are well known to those skilled in such art. For example bis(trialkoxysilylalkyl) polysulfides may be used which contain from two to about eight sulfur atoms in their polysulfidic bridge, with an average of about 2.3 to about 4 sulfur atoms. For example the polysulfidic bridge may contain an average of from about 2.3 to 3 or 3.5 to 4 sulfur atoms. The alkyl groups may be selected, for example, from methyl, ethyl, propyl groups. Therefore, a representative coupler might be, for example, a bis(triethoxysilylpropyl) polysulfide containing from 2 to 8, with an average of about 2.3 to about 4, sulfur atoms in its polysulfidic bridge.

It is to be appreciated that the coupler, if in a liquid form, might be used in conjunction with a carbon black carrier, namely, pre-mixed with a carbon black prior to the addition to the rubber composition, and such carbon black is usually to be included in the amount of carbon black accounted for in the rubber composition formulation.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

In the preparation of the rubber composition typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others such as, for example, those disclosed in *The Vanderbilt Rubber Handbook* (1978), pages 344–346. Typical amounts of antiozonants comprise about 1 to 5 phr.

Typical amounts of fatty acids, if used, which can include stearic acid, palmitic acid, linoleic acid or mixtures of one or more fatty acids, can comprise about 0.5 to about 5 phr. Often stearic acid is used in a relatively impure state and is commonly referred to in the rubber compounding practice as "stearic acid" and is so referred to in the description and practice of this invention.

Typical amounts of zinc oxide comprise about 1 to about 5 phr. Typical amounts of waxes comprise about 1 to about 5 phr. Often microcrystalline waxes are used. Typical amounts of peptizers, if used, comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1 to about 2.5, sometimes from about 1 to about 2, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2, phr. In another embodiment, combinations of a primary and a secondary accelerator might be used with the secondary accelerator being used in amounts of about 0.05 to about 3 phr in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above ingredients, other than carbon black and coupler, are not considered to be the primary subject of this invention which is more primarily directed to the use of the aforesaid carbon black composite for the reinforcement of rubber compositions, include rubber compositions for tire treads.

The ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage (s). The rubber, carbon black and coupling agent if used, are mixed in one or more non-productive mix stages. The terms "non-productive" and "productive" mix stages are well known to those having skill in the rubber mixing art.

In at least one of the non-productive (NP) mixing stages, the materials are thermomechanically mixed and the mixing temperature is allowed to reach a temperature of, for example, between 140° C. and 190° C.

The rubber composition of this invention can be used for various purposes. For example, it can be used for various tire compounds. Such tires can be built, shaped, molded and cured by various methods which are known and will be readily apparent to those having skill in such art.

The invention may be better understood by reference to the following examples in which the parts and percentages are by weight unless otherwise indicated.

EXAMPLE I

This Example is provided as an example of a contemplated practice of this invention.

Rubber compositions composed of diene-based elastomer (s) which contain the carbon black composite reinforcement, together with coupling agents, may be prepared.

The rubber compositions may be composed of (1) at least one diene based elastomer as hereinbefore described, (2) carbon black composite of this invention, (3) coupler, (4) rubber compounding ingredients including conventional amounts of zinc oxide, zinc stearate, and rubber processing oil, waxes, and antidegradants.

The thermomechanical mixing in this Example is accomplished by (a) thermomechanically working and mixing, in at least two sequential mixing steps, a mixture comprised of the said diene-based elastomer, carbon black composite, and optionally the said classical carbon black and/or precipitated silica, all in the absence of curatives cure accelerators (i) to a maximum temperature of about 160 to about 170° C. and for a duration of time, upon reaching said maximum temperature, in a range of about 2 to about 4 minutes at a temperature within about 5 to about 10° C. of said maximum temperature, followed by (b) a final mixing step in which sulfur curatives and cure accelerators are mixed with said mixture for about one to about three minutes to a temperature of about 100 to about 120° C.; whereas the rubber mixture is cooled to a temperature below about 30° C. between each of the aforesaid mixing stages.

The rubber composition may then molded and cured at an elevated pressure and temperature of about 150° C. or it may be built onto a tire carcass and the resulting assembly molded and cured at a temperature of about 150° C.

For this Example, rubber reinforcement is used in a form of about 30 to about 110 phr of reinforcing filler as the said carbon black composite.

As an alternative, such rubber reinforcing filler, within the aforesaid range of about 30 to 100 phr, can be composed of a combination of such carbon black composite together with classical carbon black and/or precipitated silica.

The carbon black composite is composed of carbon black which contains integral silica domains on its surface. Such carbon black composites have been hereinbefore described. Carbon black composites prepared by (i) cofuming of carbon black and silica and (ii) coprecipitation of carbon black and silica are contemplated. As previously described, the carbon black composite contains silanol groups on its on the surface of its silica domains and hydroxyl groups on the surface of its basic carbon black structure.

The coupler used in this example is a bis(triethoxysilylpropyl) polysulfide containing from 2 to 8 sulfur atoms in its polysulfidic bridge with an average of either (i) about 2.3 to about 3 or (ii) about 3.5 to about 4 sulfur atoms in its polysulfidic bridge.

EXAMPLE II

Tires of size 195/65R15 are contemplated as being prepared having treads, individually, of rubber compositions presented in Example I herein.

While certain representative embodiments and details have been shown for the purpose of illustrating the invention, it will be apparent to those skilled in this art that various changes and modifications may be made therein without departing from the spirit or scope of the invention.

What is claimed is:

1. A rubber composition comprised of
   (A) 100 parts by weight of at least one diene-based elastomer selected from polymers of isoprene and/or 1,3-butadiene and copolymers of isoprene and/or 1,3-butadiene with styrene;
   (B) about 30 to about 110 phr of reinforcing filler composed of (i) a carbon black composite containing integral silica on the surface thereof or (ii) about 30 to about 100 phr of said carbon black composite and at least one of (a) about 10 to about 80 phr of at least one of classical rubber reinforcing carbon black and precipitated silica; wherein said carbon black composite is prepared by co-precipitating carbon black and silica from a dispersion of carbon black in sodium silicate to provide integral silica domains on the outer surface of the carbon black; wherein said silica domains of said carbon black composite and said precipitated silica contain silanol groups on the surface thereof wherein said carbon black of said carbon black composite and said classical carbon black contain hydroxyl groups on the surface thereof; wherein the silicon to carbon ratio of said carbon black composite is in a range of about 0.1/1 to about 0.9/1, and wherein said carbon black composite is further functionalized by reacting it with a trialkoxy silane of the formula $(OR)_3SiR'$, where R is selected from methyl, ethyl and propyl radicals and R' is selected from hexyl, octyl, dodecyl, hexadecyl and octadecyl radicals, and (C) at least one coupling agent having a moiety reactive with the said silanol groups and said hydroxyl groups and another moiety interactive with at least one of said diene-based elastomers.

2. The rubber composition of claim 1 prepared by (a) thermomechanically working and mixing, in at least two sequential mixing steps, a mixture comprised of the said diene-based elastomer, carbon black composite, and optionally the said classical carbon black and/or precipitated silica, all in the absence of curatives cure accelerators accelerators (i) to a maximum temperature in a range of about 160° C. to about 180° C. over a period of from about 2 to about 5 minutes and thereafter continuing to mix said mixtures for a period of about 1 to about 10 minutes at a temperature within about 10° C. of said maximum temperature or (ii) to a maximum temperature in a range of about 155° C. to about 165° C. over a period of from about 2 to about 5 minutes and thereafter continuing to mix said mixtures for a period about four to about twenty minutes at a temperature within about 10° C. of said maximum temperature, followed by (b) a final thermomechanical mixing step in which sulfur curatives and cure accelerators are mixed with said mixture for about one to about four minutes to a temperature of about 90° C. to about 120° C.; wherein the rubber mixture is cooled to a temperature below about 40° C. between each of the aforesaid mixing stages.

3. A tire having a tread comprised of the rubber composition of claim 1 wherein said diene based elastomer(s) is selected from at least one of cis 1,4-polyisoprene rubber (natural and/or synthetic), 3,4-polyisoprene rubber, styrene/butadiene copolymer rubbers, isoprene/butadiene copolymer rubbers, styrene/isoprene copolymer rubbers, styrene/isoprene/butadiene terpolymer rubbers, cis 1,4-polybutadiene rubber, trans 1,4-polybutadiene rubber (70–95 percent trans), low vinyl polybutadiene rubber (10–30 percent vinyl), and high vinyl polybutadiene rubber having from about 35 to about 90 percent vinyl 1,2-content.

4. A tire having a tread comprised of the rubber composition of claim 2 wherein said diene based elastomer(s) is selected from at least one of cis 1,4-polyisoprene rubber (natural and/or synthetic), 3,4-polyisoprene rubber, styrene/butadiene copolymer rubbers, isoprene/butadiene copolymer rubbers, styrene/isoprene copolymer rubbers, styrene/isoprene/butadiene terpolymer rubbers, cis 1,4-polybutadiene rubber, trans 1,4-polybutadiene rubber (70–95 percent trans), low vinyl polybutadiene rubber (10–30 percent vinyl), high vinyl polybutadiene rubber having from about 35 to about 90 percent vinyl 1,2-content.

5. A tire having a tread comprised of the rubber composition of claim 1 wherein said coupler is a bis (trialkoxysilylalkyl)polysulfide having from 2 to 8, with an average of about 2.3 to about 4, sulfur atoms in its polysulfidic bridge.

6. A tire having a tread comprised of the rubber composition of claim 2 wherein said coupler is a bis (trialkoxysilylalkyl) polysulfide having from 2 to 8, with an average of about 2.3 to about 4, sulfur atoms in its polysulfidic bridge.

7. The tire of claim 5, wherein said coupler is a bis (triethoxysilylpropyl) polysulfide.

8. The tire of claim 6 wherein said coupler is a bis (triethoxysilylpropyl) polysulfide.

9. A tire having a tread comprised of the rubber composition of claim 1.

10. A tire having a tread comprised of the rubber composition of claim 2.

* * * * *